(12) United States Patent
Sasahara

(10) Patent No.: US 9,729,740 B2
(45) Date of Patent: Aug. 8, 2017

(54) IMAGE DISPLAY DEVICE

(71) Applicant: TOSHIBA TEC KABUSHIKI KAISHA, Shinagawa-ku, Tokyo (JP)

(72) Inventor: Katsuya Sasahara, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/859,443

(22) Filed: Sep. 21, 2015

(65) Prior Publication Data

US 2017/0085727 A1    Mar. 23, 2017

(51) Int. Cl.
*H04N 1/46* (2006.01)
*G06F 3/12* (2006.01)
*H04N 1/00* (2006.01)
*H04N 1/10* (2006.01)

(52) U.S. Cl.
CPC ....... *H04N 1/0049* (2013.01); *H04N 1/00488* (2013.01); *H04N 1/00493* (2013.01); *H04N 1/1065* (2013.01); *H04N 2201/0089* (2013.01); *H04N 2201/0091* (2013.01); *H04N 2201/0438* (2013.01)

(58) Field of Classification Search
None
See application file for complete search history.

(56) References Cited

U.S. PATENT DOCUMENTS

| | | | | |
|---|---|---|---|---|
| 4,860,377 A * | 8/1989 | Ishigaki | ................. | H04N 1/047 235/470 |
| 5,177,328 A * | 1/1993 | Ito | ........................... | G06F 3/044 178/18.03 |
| 5,202,844 A * | 4/1993 | Kamio | .................. | G06F 1/1616 708/141 |
| 5,243,149 A * | 9/1993 | Comerford | ........... | G06F 1/1626 178/18.03 |
| 8,054,483 B2 * | 11/2011 | Katsuyama | ........ | H04N 1/00326 358/1.1 |
| 8,089,647 B2 * | 1/2012 | Hotta | ..................... | G06K 9/222 271/257 |
| 8,228,299 B1 * | 7/2012 | Maloney | ................ | G06Q 20/14 345/173 |

(Continued)

FOREIGN PATENT DOCUMENTS

| | | |
|---|---|---|
| JP | 2005-346701 | 12/2005 |
| JP | 2006-004409 | 1/2006 |

*Primary Examiner* — Madelein Nguyen
(74) *Attorney, Agent, or Firm* — Amin, Turocy & Watson LLP; Gregory Turocy

(57) ABSTRACT

An image display device according to the embodiment includes a display screen, an operation input unit, a control unit, and a notification unit. The display screen displays an image using a display mechanism in which scanning can be optically performed in a copy machine. The operation input unit is arranged at a position of being operated in a state in which a display screen is placed on a glass original document table so as to face the glass original document table of a copy machine, and receives an operation input of a user. When a plurality of images are set to display targets in the display screen, the control unit switches an image displayed on the display screen according to the operation input of a user with respect to the input operation unit. The notification unit notifies of switching of an image when the image displayed on the display screen is switched.

13 Claims, 23 Drawing Sheets

(56) References Cited

U.S. PATENT DOCUMENTS

| | | | | |
|---|---|---|---|---|
| 8,823,963 B2* | 9/2014 | Imaizumi | G06F 3/1204 | 358/1.13 |
| 2001/0021038 A1* | 9/2001 | Yoshihara | G03G 15/00 | 358/1.15 |
| 2002/0105674 A1* | 8/2002 | Nomura | H04N 1/00278 | 358/1.15 |
| 2003/0108347 A1* | 6/2003 | Manico | G03B 7/24 | 396/207 |
| 2009/0324096 A1* | 12/2009 | Megawa | G06F 17/30011 | 382/206 |
| 2011/0007037 A1* | 1/2011 | Ogawa | G06F 3/03545 | 345/179 |
| 2011/0063673 A1* | 3/2011 | Yoshida | H04N 1/00129 | 358/1.15 |
| 2011/0075187 A1* | 3/2011 | Imine | H04N 1/00442 | 358/1.14 |
| 2011/0090541 A1* | 4/2011 | Harper | G06F 21/32 | 358/474 |
| 2012/0194410 A1* | 8/2012 | Morimoto | G06F 3/14 | 345/1.1 |
| 2012/0243020 A1* | 9/2012 | Saito | B41J 3/46 | 358/1.13 |
| 2013/0004012 A1* | 1/2013 | Huang | A45C 11/00 | 381/388 |
| 2013/0009921 A1* | 1/2013 | Yamano | G09G 3/20 | 345/204 |
| 2013/0106808 A1* | 5/2013 | Shiraishi | G06F 1/1694 | 345/204 |
| 2014/0022590 A1* | 1/2014 | Matsuda | G06F 3/1273 | 358/1.15 |
| 2014/0064559 A1* | 3/2014 | Sugasawa | G06K 9/00671 | 382/103 |
| 2014/0085460 A1* | 3/2014 | Park | G06F 21/84 | 348/135 |
| 2014/0098060 A1* | 4/2014 | McQuade | G06F 3/045 | 345/174 |
| 2014/0100973 A1* | 4/2014 | Brown | G06Q 20/34 | 705/17 |
| 2014/0104637 A1* | 4/2014 | Mizutani | H04N 1/0048 | 358/1.14 |
| 2014/0117656 A1* | 5/2014 | Lam | B42D 1/00 | 281/19.1 |
| 2014/0316917 A1* | 10/2014 | Westby | G06Q 20/18 | 705/18 |
| 2015/0043748 A1* | 2/2015 | Sudo | H04R 17/00 | 381/102 |
| 2015/0043825 A1* | 2/2015 | Sugiura | G06F 3/04883 | 382/189 |
| 2015/0074615 A1* | 3/2015 | Han | G06K 9/00033 | 715/863 |
| 2015/0100910 A1* | 4/2015 | Luo | G06F 3/04883 | 715/771 |
| 2015/0142870 A1* | 5/2015 | Hashimoto | H04L 51/08 | 709/203 |
| 2015/0288849 A1* | 10/2015 | Tredoux | H04N 1/32464 | 358/1.15 |
| 2015/0293731 A1* | 10/2015 | Yamada | H04N 1/0035 | 358/1.15 |
| 2015/0312436 A1* | 10/2015 | Mutsuo | H04N 1/04 | 358/475 |
| 2016/0119492 A1* | 4/2016 | Sasahara | H04N 1/00411 | 358/1.15 |
| 2016/0154473 A1* | 6/2016 | Yato | G06F 1/1632 | 345/156 |
| 2016/0173840 A1* | 6/2016 | Kurakake | G06F 3/00 | 348/745 |
| 2016/0188181 A1* | 6/2016 | Smith | G06F 3/048 | 715/765 |
| 2016/0259528 A1* | 9/2016 | Foss | G06F 3/0482 | |
| 2016/0261770 A1* | 9/2016 | Sasahara | H04N 1/448 | |
| 2016/0293139 A1* | 10/2016 | Kwon | G09G 5/02 | |
| 2016/0295063 A1* | 10/2016 | Farah | H04N 1/121 | |
| 2017/0018040 A1* | 1/2017 | Sasahara | G06Q 50/12 | |

\* cited by examiner

IMAGE DISPLAY DEVICE

FIELD

Embodiments described herein relate generally to a portable image display device, and an image display method in the portable image display device.

BACKGROUND

In the related art, among portable image display devices such as a mobile tablet, since electronic paper is a display mechanism in which an image displayed on a display screen is viewed using reflected light, similarly to paper, for example, it is possible to copy or scan the image in a copy machine, or the like. When an image displayed on the electronic paper is scanned using a copy machine, or the like, a screen on which the image is displayed is placed downward on an original document table of the copy machine, or the like. However, when there are images of a plurality of pages which are scanning targets, it is necessary to repeat an operation of turning over a page on a screen of the above described portable image display device, and then placing the page on a copy machine, or the like, a plurality of times, and it is troublesome.

DETAILED DESCRIPTION

An image display device according to an embodiment includes a display screen, an operation input unit, a control unit, and a notification unit. The display screen displays an image using a display mechanism in which scanning can be optically performed in a copy machine. The operation input unit is arranged at a position of being operated in a state in which a display screen is placed on a glass original document table so as to face the glass original document table of a copy machine, and receives an operation input of a user. When a document of a plurality of pages is set to a display target in the display screen, the control unit turns a page which will be displayed on the display screen according to an operation input by a user with respect to the input operation unit. The notification unit notifies of turning over of a page when the page displayed on the display screen according to the operation input is turned over.

First Embodiment

When an image displayed in a portable image display device is scanned in a copy machine, a display screen on which the image is displayed is placed on a copy machine so as to face a glass original document table of the copy machine. When there are images of a plurality of pages which are scanning targets, it is necessary to repeat an operation of turning over a page on the display screen, and then placing the page on a copy machine a plurality of times, and it is complicated. According to a first embodiment, an operation input unit is arranged at a position at which the operation input unit can be operated in a state in which the image display device is placed on the copy machine. In this manner, it is possible to perform page turning in a state in which the image display device is placed on the copy machine.

Figure 1:
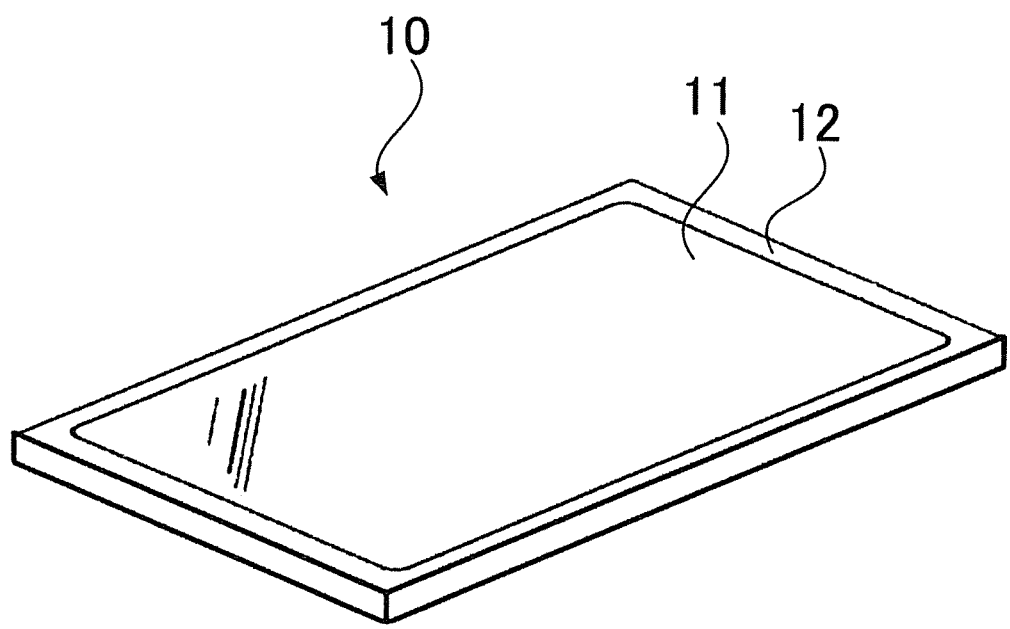
FIG. 1 is a diagram which illustrates the front surface of an image display device according to a first embodiment.
Figure 2:
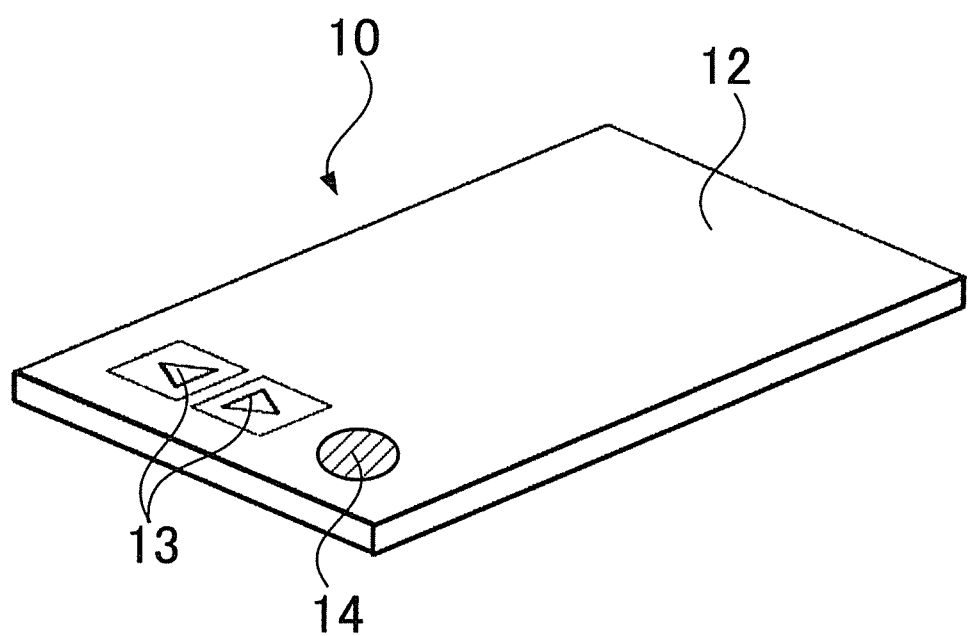
FIG. 2 is a diagram which illustrates the rear surface of the image display device according to the first embodiment.

FIG. 1 is a diagram which illustrates the front surface of the image display device according to the first embodiment. FIG. 2 is a diagram which illustrates the rear surface of the image display device according to the first embodiment.

An image display device 10 according to the embodiment includes a display screen 11, a housing rear surface 12, an operation input unit 13, and a notification unit 14. The operation input unit 13 and the notification unit 14 are arranged at predetermined positions on a face of the housing rear surface 12 opposite to a face on which the display screen is arranged. The display screen 11 displays an image using a mechanism in which scanning can be optically performed in a copy machine. Here, as the mechanism in which scanning can be optically performed in a copy machine, it is possible to use electronic paper, for example. The electronic paper is a medium in which display contents can be electrically rewritten among display mediums which have visibility or portability which are good points of paper. Since the electronic paper displays a display image using reflected light from a display screen, similarly to paper, scanning is also possible in a copy machine. In addition, the display screen 11 uses a touch panel. The touch panel is a device in which one point on a screen can be designated by being directly touched on the screen. As a mechanism of detecting a touched position, there is a pressure sensitive type in which a portion deformed by being pressed with a finger is detected, and an electrostatic type in which a weak current flows on the front surface of a screen, and a change when a current flows in a touched finger is detected. In the image display device 10, the image display device 10 is operated when the display screen 11 is touched. The operation input unit 13 is arranged at a predetermined position on a face of the housing rear surface 12 opposite to a face on which the display screen is arranged, and a user can perform an input operation even in a state in which the display screen 11 is placed so as to face the lower part. As the state in which the display screen 11 is arranged so as to face the lower part, for example, a case in which an image which is displayed on the display screen 11 is scanned in a copy machine is taken into consideration. The reason for this is that the image display device 10 is placed on the glass original document table so that the display screen 11 faces the glass original document table, when an image displayed on the display screen 11 is scanned.

Figure 3:
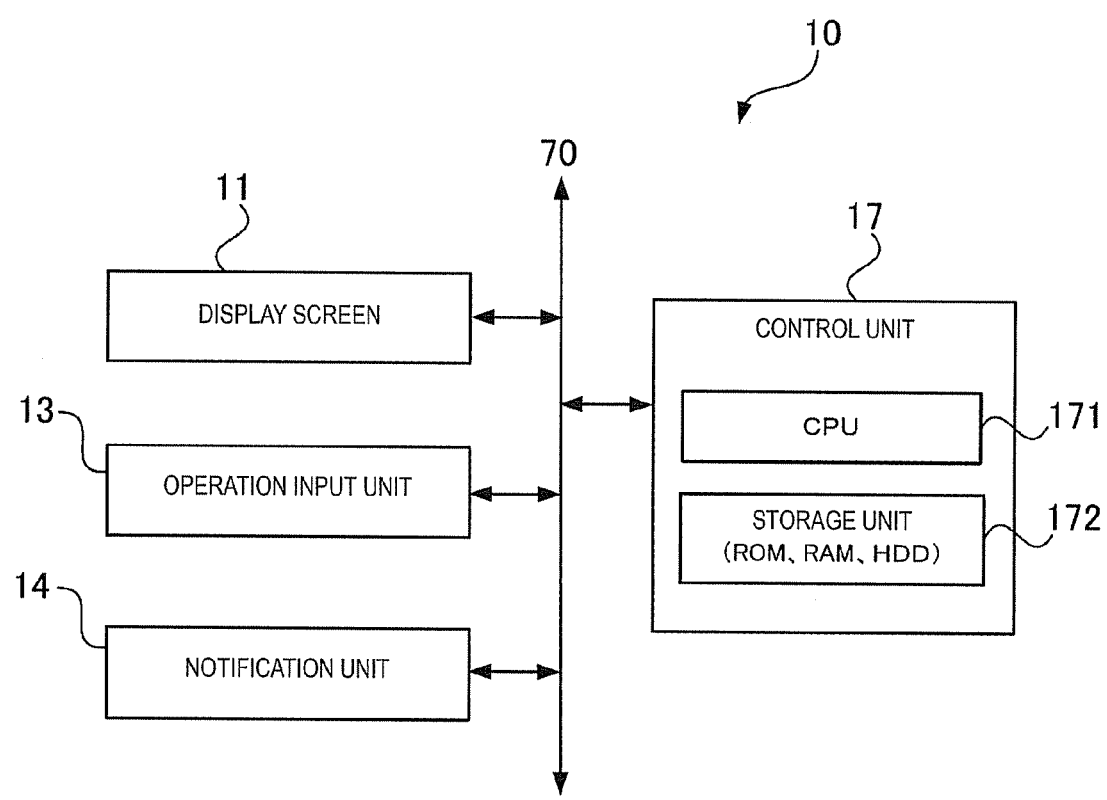
FIG. 3 is a block diagram which illustrates a hardware configuration of the image display device according to the first embodiment.

FIG. 3 is a block diagram which illustrates a hardware configuration of the image display device according to the first embodiment.

In the image display device 10, the display screen 11, the operation input unit 13, the notification unit 14, and a control unit 17 are connected to each other through a communication bus 70. The control unit 17 includes a CPU 171 and a storage unit 172, and controls operations of the image display device 10.

The CPU 171 is an arithmetic processing unit, and executes various functions by downloading a computer program which is stored in the storage unit 172 in advance, and executes the program. The storage unit 172 is configured of a Read Only Memory (ROM), a Random Access Memory (RAM), an Electrically Erasable Programmable Read-Only Memory (EEPROM), and the like, and in which a computer program which is used when performing a control using the control unit 171, or data which is generated when executing the computer program is stored.

Figure 4:
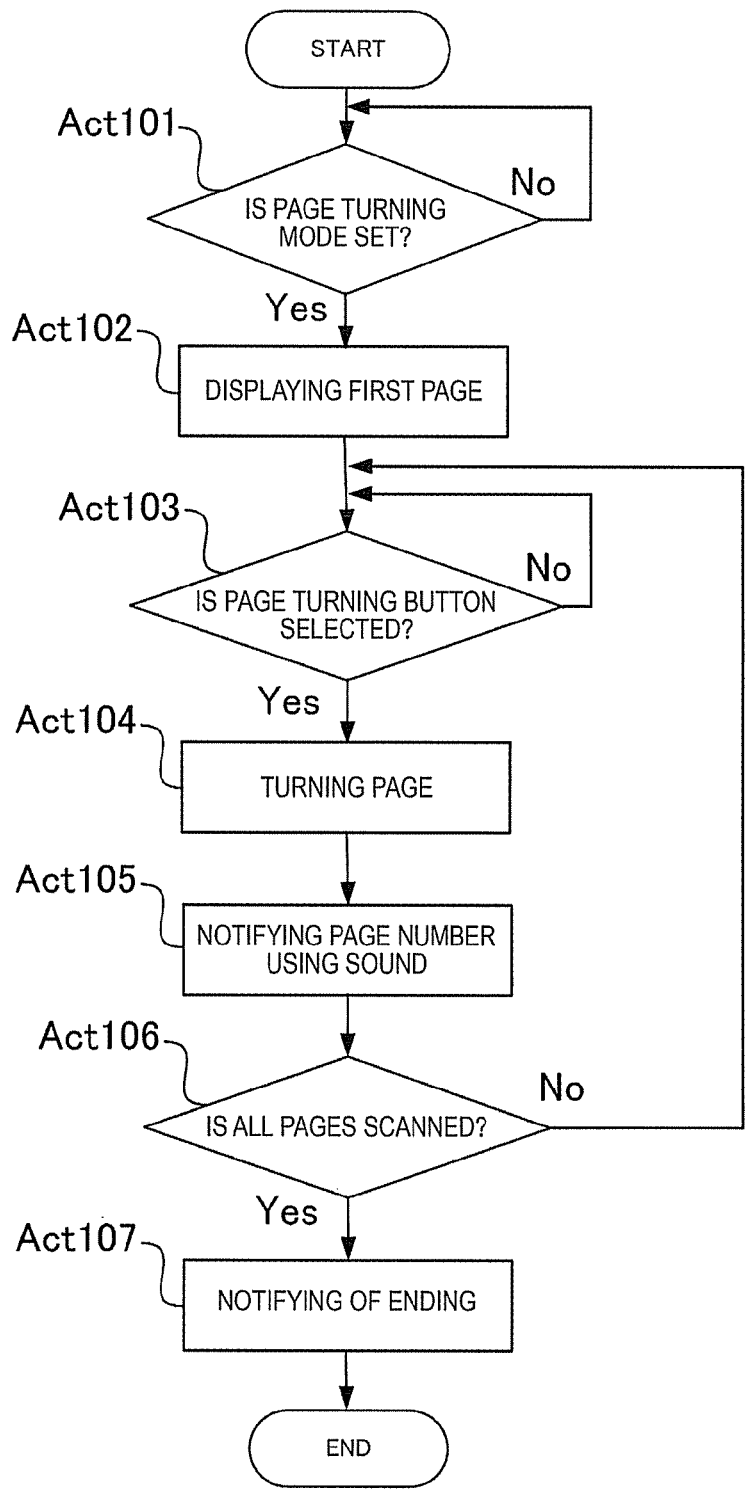
FIG. 4 is a flowchart which illustrates a flow of a page turning operation according to the first embodiment.
Figure 5:
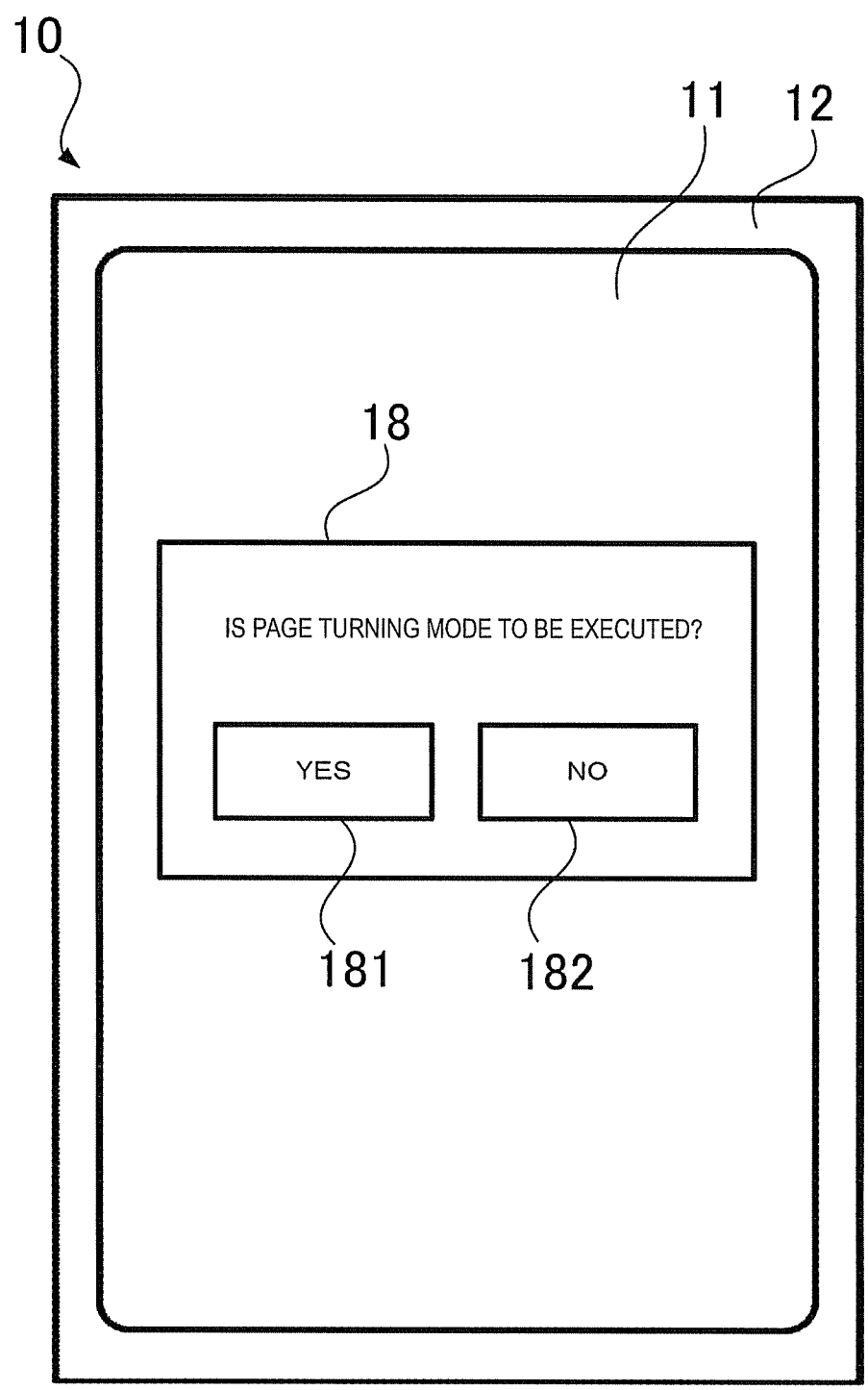
FIG. 5 is a diagram which illustrates a state in which a page turning mode selection screen is displayed in the image display device.
Figure 6:
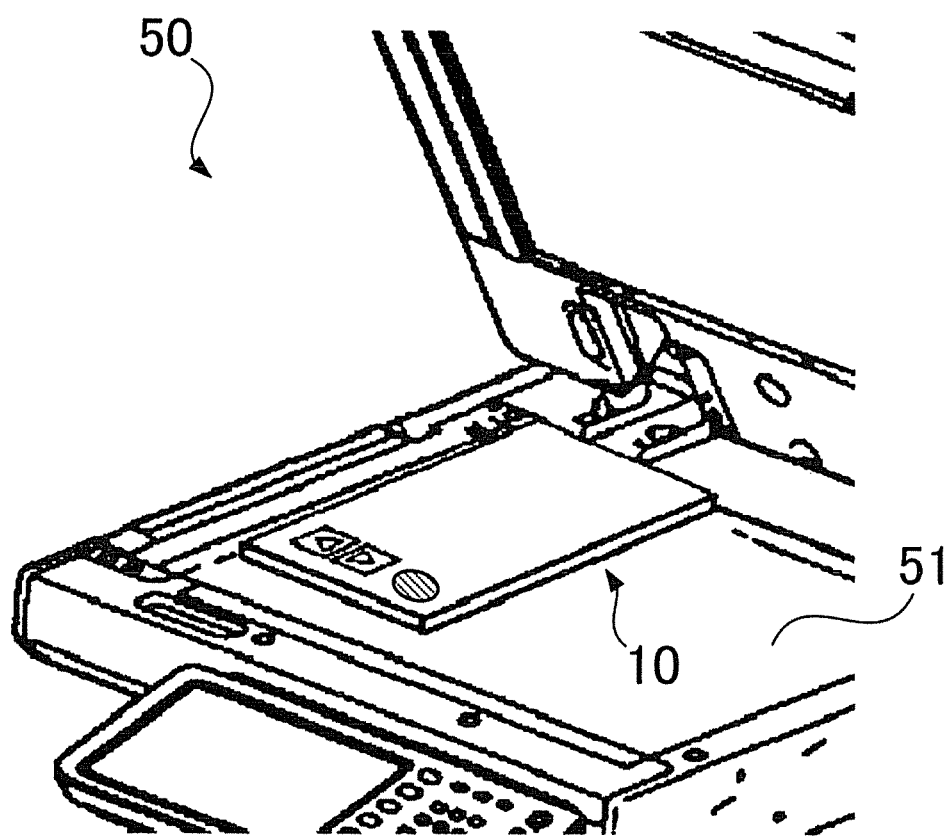
FIG. 6 is a diagram which illustrates a state in which an image displayed in the image display device according to the first embodiment is scanned using a copy machine.
Figure 7:
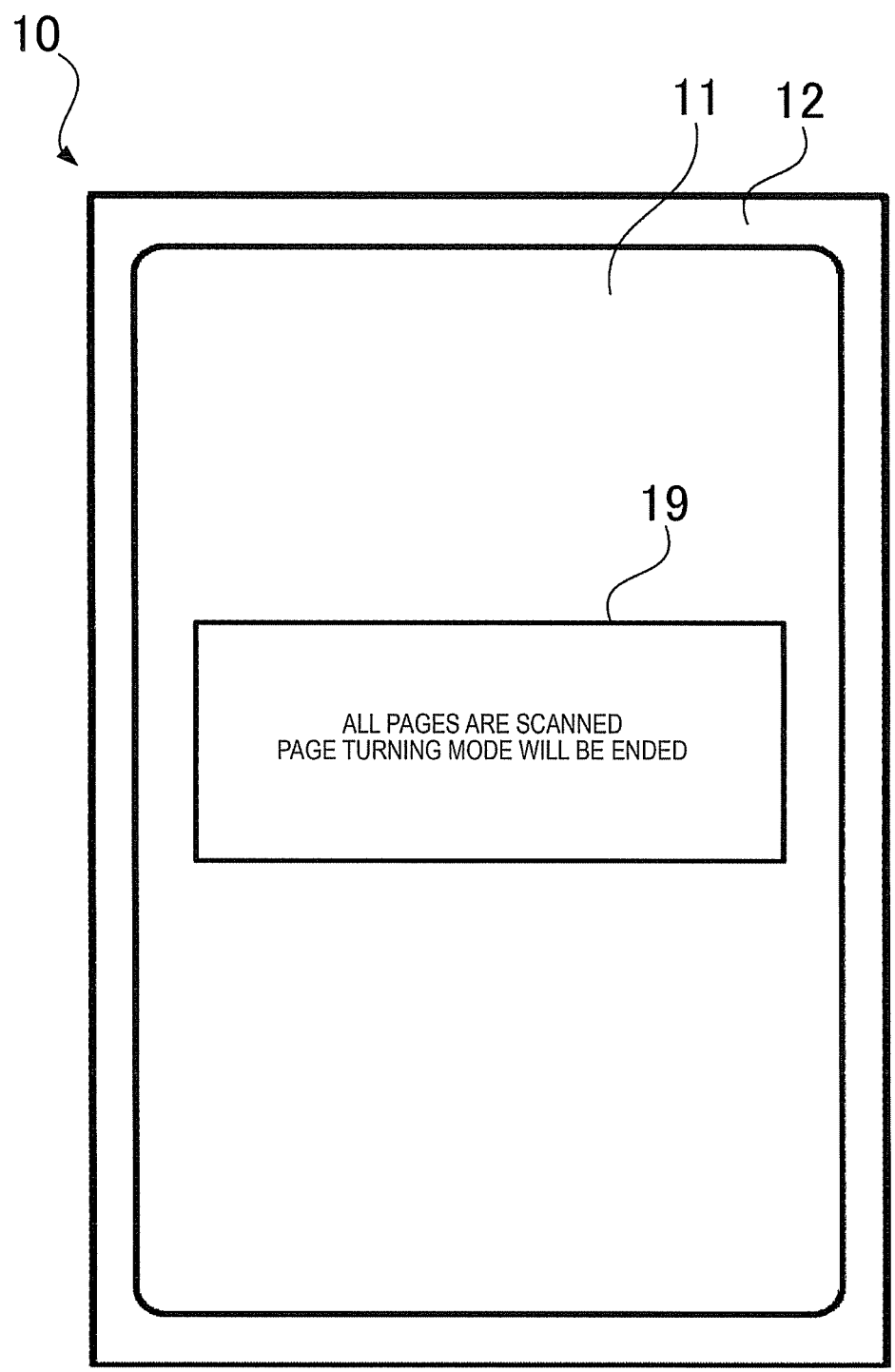
FIG. 7 is a diagram which illustrates a state in which an ending display of the page turning mode is displayed in the image display device.

FIG. 4 is a flowchart which illustrates a flow when executing a page turning mode in the image display device 10. FIG. 5 is a diagram which illustrates a state in which a page turning mode selection display is displayed in the image display device 10. FIG. 6 is a diagram which illustrates a state in which an image displayed in the image display device is scanned using a copy machine. FIG. 7 is a diagram which illustrates a state in which a display denoting ending of the page turning mode is performed on the display screen.

In Act 101, when a user sets a page turning mode with respect to the image display device 10, the process proceeds to Act 102 (Yes in Act 101). Meanwhile, when a user does not set the page turning mode with respect to the image display device 10, the process does not proceed to Act 102 (No in Act 101). In Act 101, a user sets the page turning mode on the display screen 11 which is a touch panel. Here, it is necessary for the user to select image data which is a target for executing the page turning mode. When the user selects the page turning mode with respect to the image data as the target, as illustrated in FIG. 5, a page turning mode selection display 18 is displayed on the display screen 11. The page turning mode selection display 18 includes a Yes button 181 and a No button 182, and when the Yes button 181 is selected, the image display device 10 enters the page turning mode.

In Act 102, when the page turning mode is selected by a user, the first image among a plurality of images which are scanning targets is displayed on the display screen 11 when the control unit 17 controls the display screen 11.

In Act 103, when a user executes scanning with respect to one image among the scanning targets, and inputs page turning with respect to the image display device 10, the process proceeds to Act 104 (Yes in Act 103). On the other hand, when the user does not input page turning with respect to the image display device 10, the process does not proceed to Act 104 (No in Act 103). The user inputs page turning with respect to the image display device 10 by pressing the operation input unit 13 in the image display device 10. Here, the operation input unit 13 in the embodiment is a button type.

In Act 104, an image displayed on the display screen 11 is switched to an image on the next page when the control unit 17 controls the display screen 11. According to the embodiment, when the operation input unit 13 is arranged on a rear surface 16 of the image display device 10, it is possible to switch an image which is displayed on the display screen 11 even when the display screen 11 is placed by facing the lower part.

In Act 105, the notification unit 14 notifies a user of turning over of a page when the control unit 17 controls the notification unit 14. The turning over of a page means that an image as a scanning target which is displayed on the display screen 11 is switched to an image as another scanning target. As a notification method in the notification unit 14, there is, for example, a notification using sound, a notification using lighting or blinking of light, or the like. As the notification using sound, for example, it is possible to perform a notification using sound such as "Image is switched" with respect to a user. In addition, as the notification using lighting or blinking of light, for example, it is possible to light up an LED light bulb, or cause the LED light bulb to be blinked when a page is turned over, by attaching the LED light bulb to the rear surface 16 of the image display device 10.

In Act 106, when scanning with respect to all of a plurality of images as the scanning target ends, the process proceeds to Act 107 (Yes in Act 106). On the other hand, when scanning with respect to all of plurality of images as the scanning target does not end in Act 106, the process proceeds to Act 103 (No in Act 106).

In Act 107, the notification unit 14 notifies of ending of the page turning mode when the control unit 17 controls the notification unit 14. As a method of notifying of ending of the page turning mode, there is a notification using sound, a notification using lighting or blinking of a light, or the like. As the notification using sound, for example, notifying of ending using sound such as "Page turning mode is ended" is performed. In addition, as the notification using lighting or blinking of light, for example, notifying of ending is performed by blinking a light for a predetermined time (for example, 10 seconds). Here, it is not necessary for a blinking time of light to be 10 seconds, it may be any blinking time in which a notification of page turning can be distinguished from a notification of ending of the page turning mode.

In addition, the image display device 10 can display ending of the page turning mode on the display screen 11. In this case, it is possible to display a page turning mode ending notification 19 on the display screen 11 as illustrated in FIG. 7, when the control unit 17 controls the display screen 11. As the page turning mode ending notification 19, for example, it is possible to display "Page turning mode ends" using a text on the display screen 11.

Second Embodiment

According to a second embodiment, the rear surface of an image display device becomes a touch panel display screen. When a page turning mode is executed, the same image as an image displayed on a display screen on the front surface is displayed on a display screen on the rear surface. When the same image is displayed on the rear surface and the front surface, it is possible to view the image displayed on the front surface from the rear surface, even when the front surface is placed by facing the lower part.

When describing the second embodiment, components having the same function as those in the first embodiment are given the same reference numerals, and descriptions thereof will be omitted.

Figure 8:
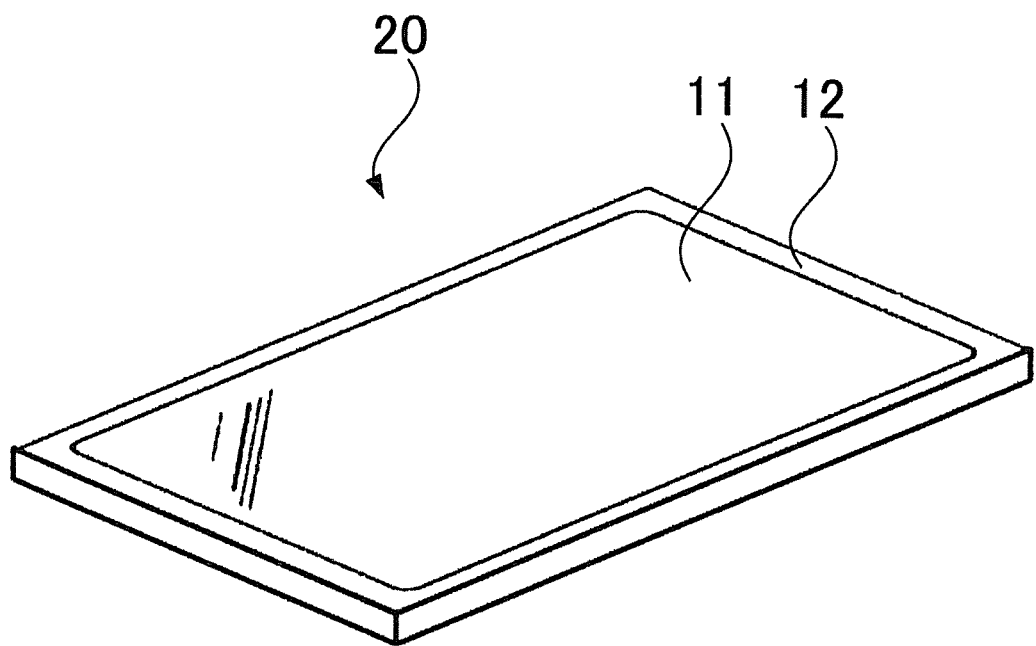
FIG. 8 is a diagram which illustrates the front surface of an image display device according to a second embodiment.

FIG. 8 illustrates the front surface of an image display device according to the second embodiment.

Figure 9:
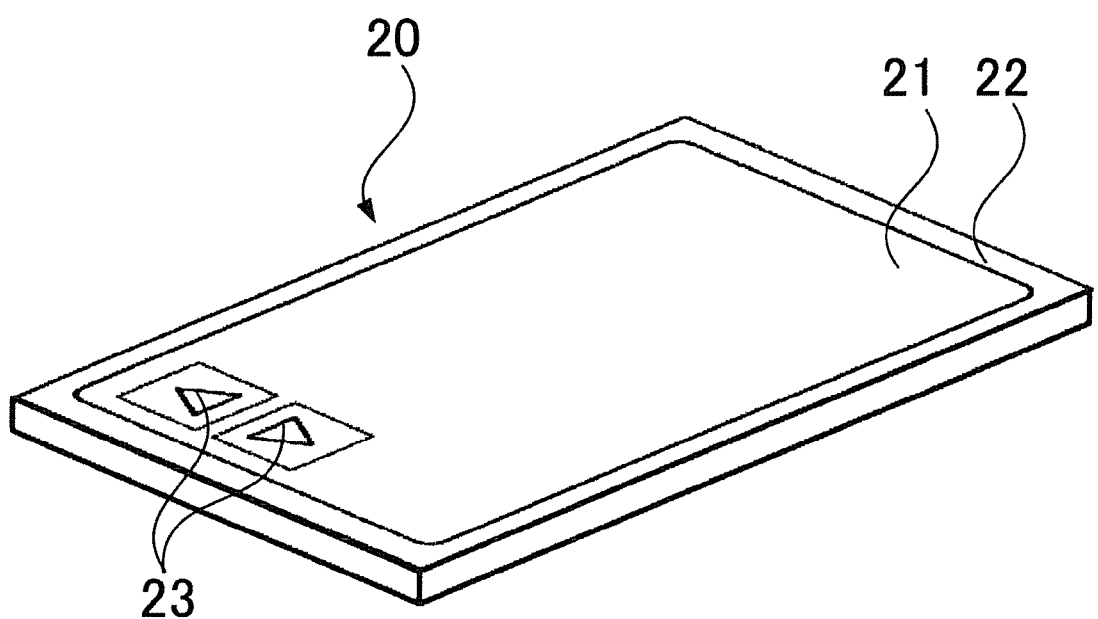
FIG. 9 is a diagram which illustrates the rear surface of the image display device according to the second embodiment.

FIG. 9 illustrates the rear surface of the image display device according to the second embodiment.

An image display device 20 according to the second embodiment includes a display screen 11, a rear surface display screen 21, a housing 22, and an operation input unit 23.

The display screen 11 is arranged so as to be surrounded with the housing 22 in the image display device 20. In addition, the rear surface display screen 21 is arranged on a face opposite to a face on which the display screen 11 is arranged in the image display device 20, and is arranged so as to be surrounded with the housing 22. In addition, the rear surface display screen 21 is a touch panel similarly to the display screen 11, and the operation input unit 23 is displayed on the rear surface display screen 21.

Figure 10:
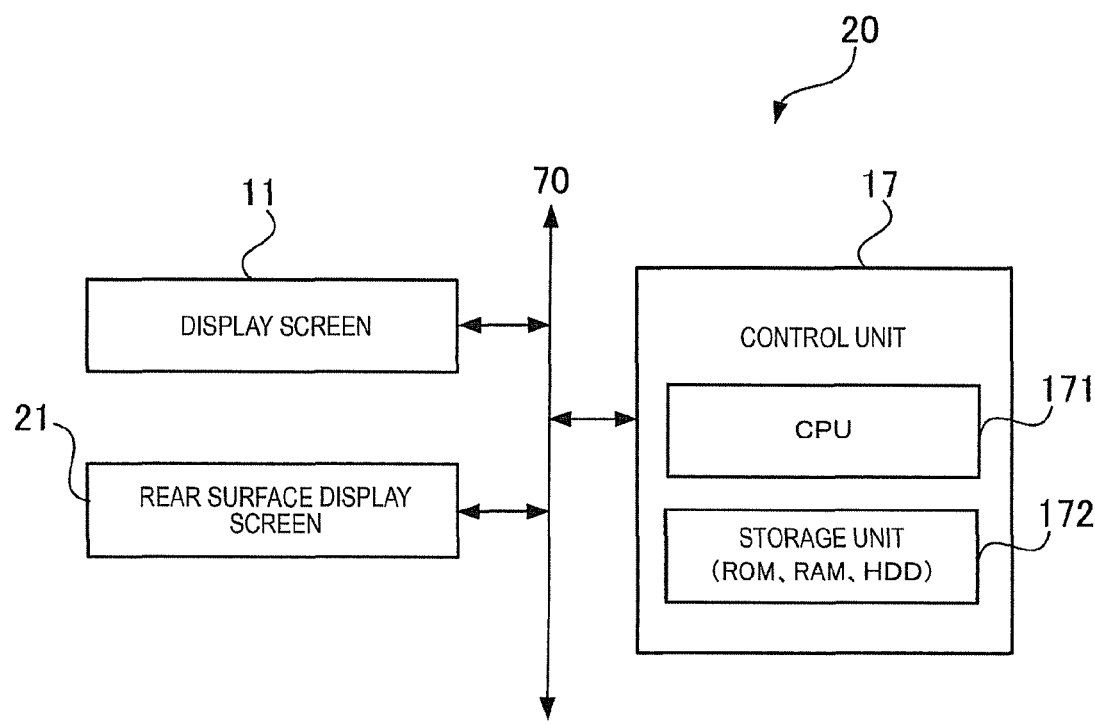
FIG. 10 is a block diagram which illustrates a hardware configuration of the image display device according to the second embodiment.

FIG. 10 is a block diagram which illustrates a hardware configuration of the image display device according to the second embodiment.

In the image display device 20, the display screen 11, the rear surface display screen 21, and a control unit 17 are connected to each other through a communication bus 70.

Figure 11:
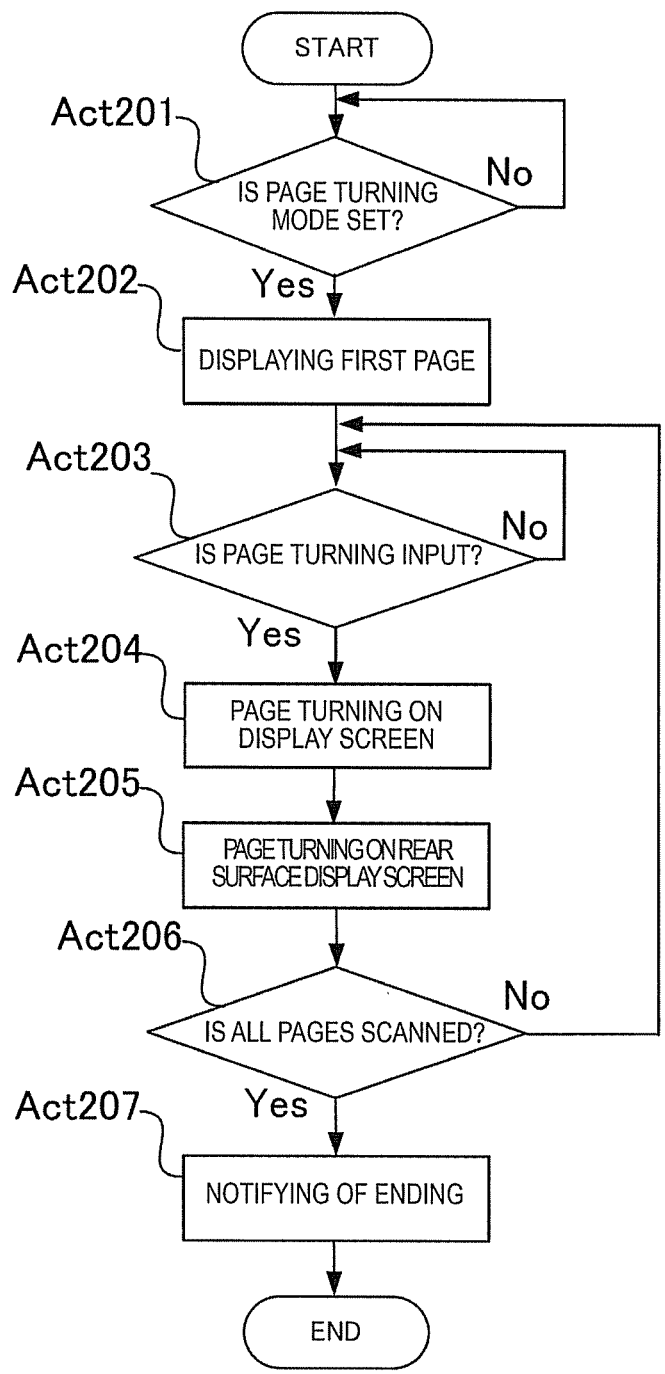
FIG. 11 is a flowchart which illustrates a flow of a page turning operation in the second embodiment.
Figure 12:
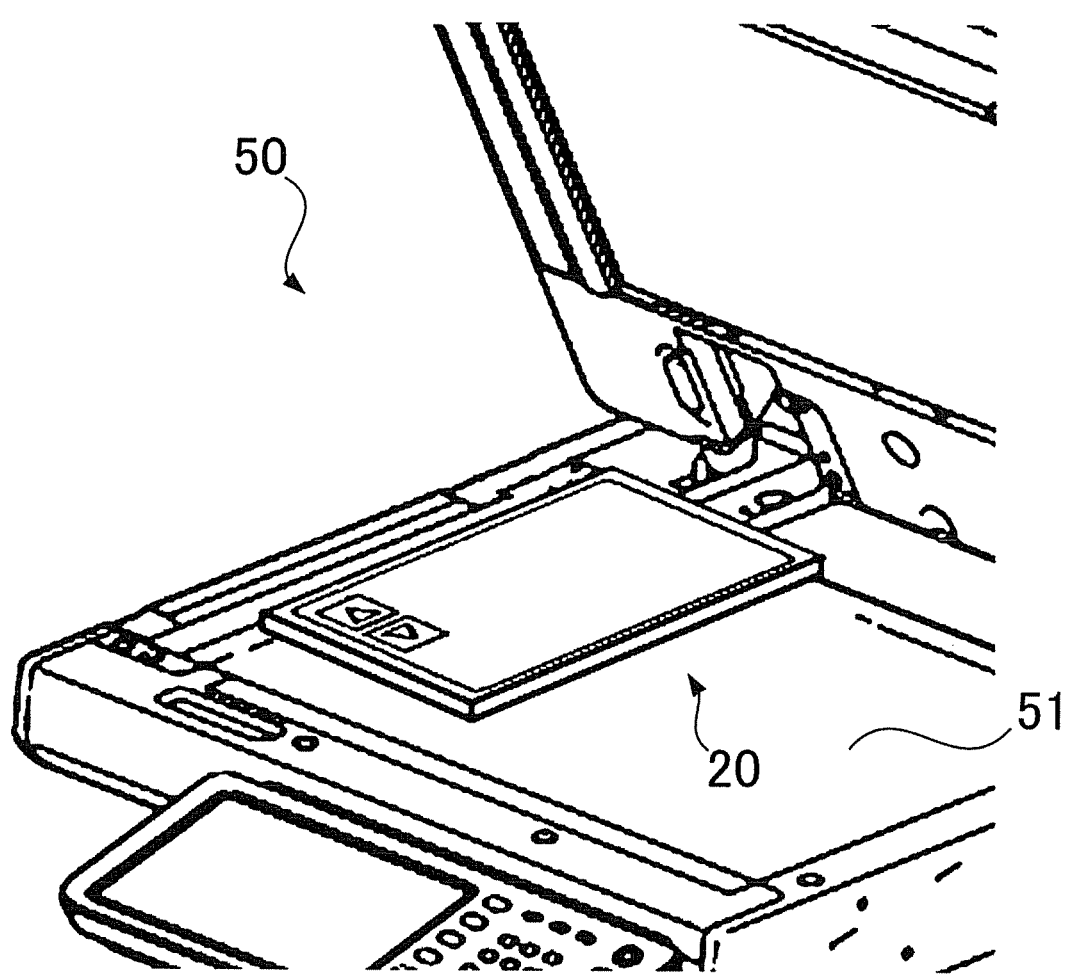
FIG. 12 is a diagram which illustrates a state in which an image displayed in the image display device according to the second embodiment is scanned using a copy machine.

FIG. 11 is a flowchart which illustrates a flow when the image display device according to the second embodiment executing a page turning mode. FIG. 12 is a diagram which illustrates a state in which an image displayed on the image display device according to the second embodiment is scanned using a copy machine.

In Act 201, when a user sets a page turning mode with respect to the image display device 20, the process proceeds to Act 202 (Yes in Act 201). On the other hand, when the user does not set the page turning mode with respect to the image display device 20 in Act 201, the process does not proceed to Act 202 (No in Act 201). Setting of the page turning mode in the image display device 20 is the same as that in the first embodiment.

In Act 202, when the page turning mode is selected by a user, the first image among a plurality of images as scanning targets is displayed on the display screen 11 when the control unit 17 controls the display screen 11.

In Act 203, when the user executes scanning with respect to one image among images as the scanning targets, and inputs page turning in the image display device 20, the process proceeds to Act 204 (Yes in Act 203). On the other hand, when the user does not input page turning in the image display device 20 in Act 203, the process does not proceed to Act 204 (No in Act 203). According to the embodiment, since the operation input unit 23 is displayed on the touch panel, the user inputs page turning by touching the operation input unit 23.

In Act 204, an image displayed on the display screen is switched to an image on the next page when the control unit 17 controls the display screen 11. Since the operation input unit 23 is displayed on the rear surface display screen 21, it is possible to switch an image displayed on the display screen 11 even in a state in which the image display device 20 is placed so that the display screen 11 faces the lower part.

In Act 205, the same image as that which is displayed on the display screen 11 is displayed on the rear surface display screen 21 when the control unit 17 controls the rear surface display screen 21. It is possible to check the image displayed on the display screen 11 from the rear surface display screen 21 when the image displayed on the display screen 11 is displayed on the rear surface display screen 21. That is, it is possible to check the image displayed on the display screen 11 even when the image display device 20 is placed so that the display screen 11 faces the lower part. In this manner, as illustrated in FIG. 12, even when the image display device 20 is placed on the glass original document table so that the display screen 11 faces the glass original document table of a copy machine, it is possible to switch an image displayed on the display screen 11 in the state as is, and to check the image.

In Act 206, when scanning with respect to all of the images as scanning targets of the page turning mode ends, the process proceeds to Act 207 (Yes in Act 206). On the other hand, when scanning with respect to all of images as scanning targets of the page turning mode does not end, the process proceeds to Act 203 (No in Act 206).

In Act 207, the page turning mode ending notification 19 is displayed on the rear surface display screen 21 when the control unit 17 controls the rear surface display screen 21 (refer to FIG. 7). Here, the page turning mode ending notification 19 may be displayed on the display screen 11.

Third Embodiment

In a third embodiment, optical sensors are provided at a frame which is arranged at the periphery of a display screen in an image display device. When the image display device is placed so that a display screen faces the lower part, an image displayed on the image display device is switched when the optical sensor detects brightness with a threshold value or greater.

Figure 13:
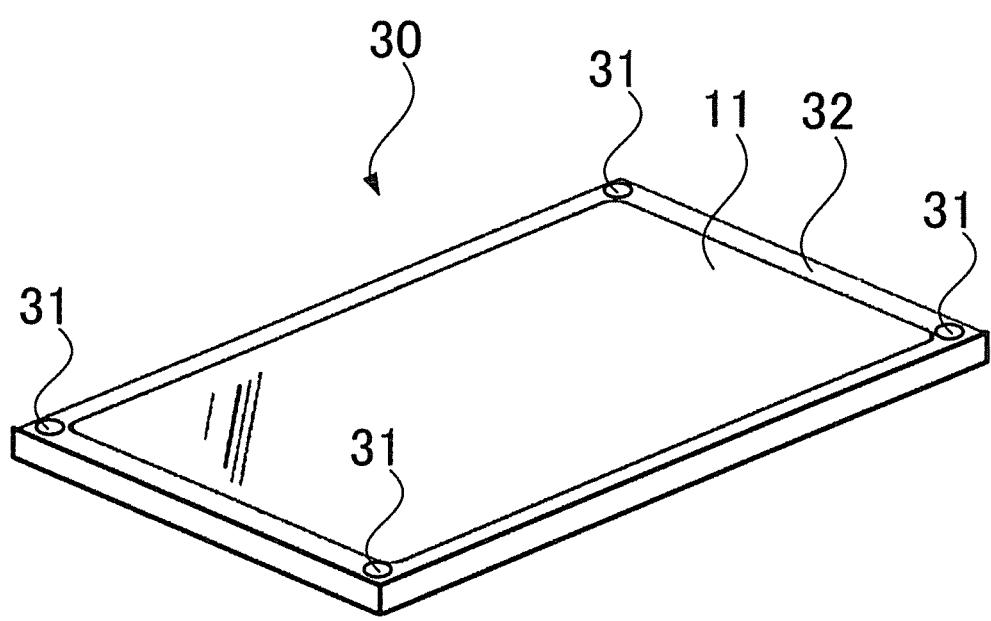
FIG. 13 is a diagram which illustrates the front surface of an image display device according to a third embodiment.
Figure 14:
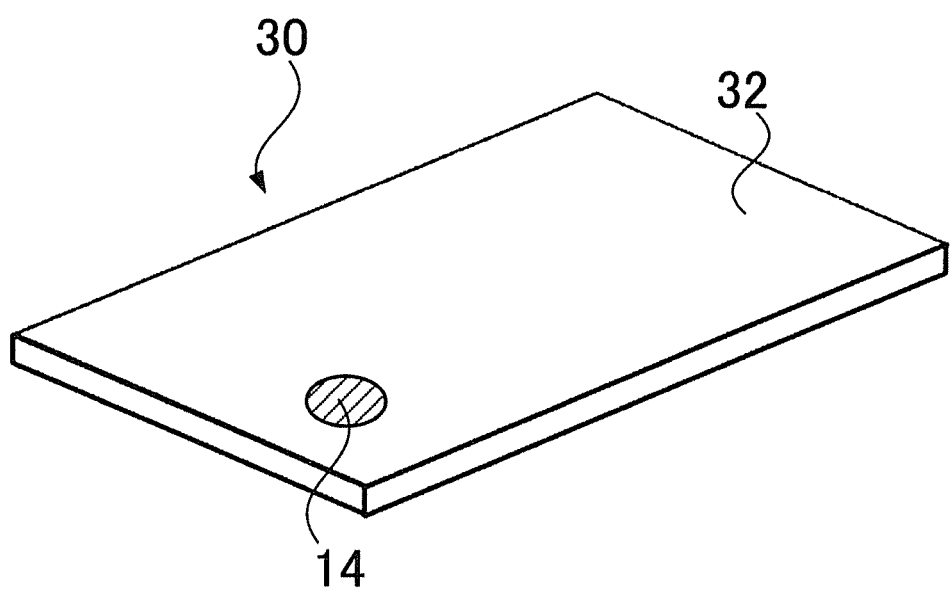
FIG. 14 is a diagram which illustrates the rear surface of the image display device according to the third embodiment.

FIG. 13 is a diagram which illustrates the front surface of the image display device according to the third embodiment. In addition, FIG. 14 is a diagram which illustrates the rear surface of the image display device according to the third embodiment.

When describing the third embodiment, components having the same function as those in the first embodiment are given the same reference numerals, and descriptions thereof will be omitted.

In the third embodiment, an image display device 30 includes a display screen 11, a notification unit 14, an optical sensor 31, and a housing 32.

In the image display device 30, the display screen 11 is arranged so as to be surrounded with the housing 32, and the optical sensor 31 is arranged at the periphery of the display screen 11 in the housing 32. The optical sensor 31 detects brightness of a threshold value or more. Here, the optical sensor is a sensor which can detect an electromagnetic energy such as light.

Figure 15:
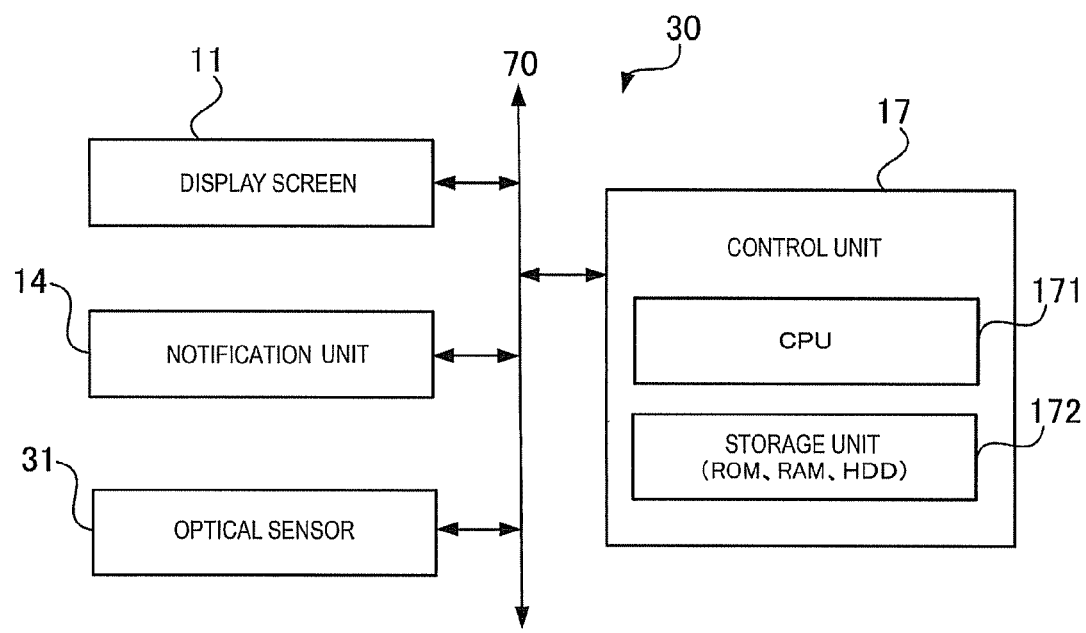
FIG. 15 is a block diagram which illustrates a hardware configuration of the image display device according to the third embodiment.

FIG. 15 is a block diagram which illustrates a hardware configuration of the image display device according to the third embodiment.

In the image display device 30, the display screen 11, the notification unit 14, the optical sensor 31, and a control unit 17 are connected to each other through a communication bus 70.

Figure 16:
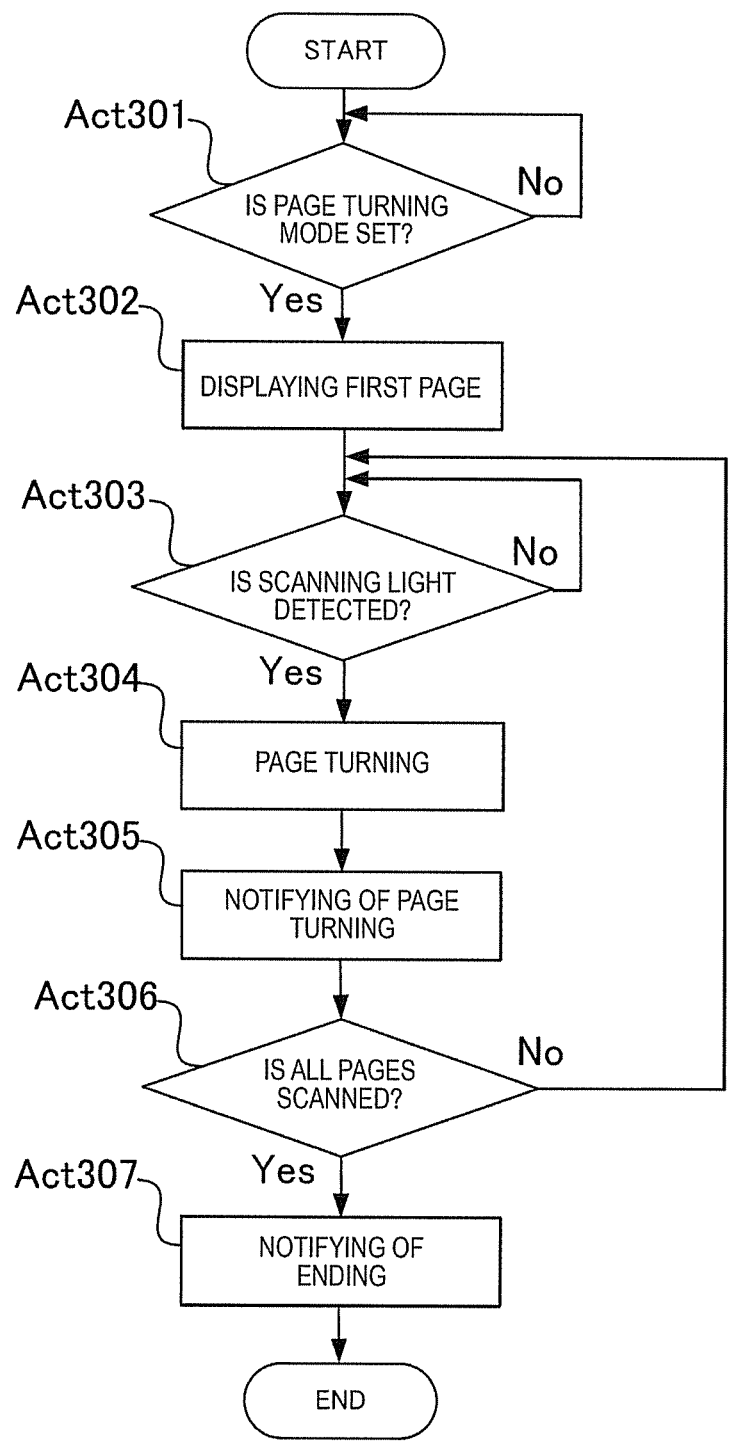
FIG. 16 is a flowchart which illustrates a flow of a page turning operation in the third embodiment.
Figure 17:
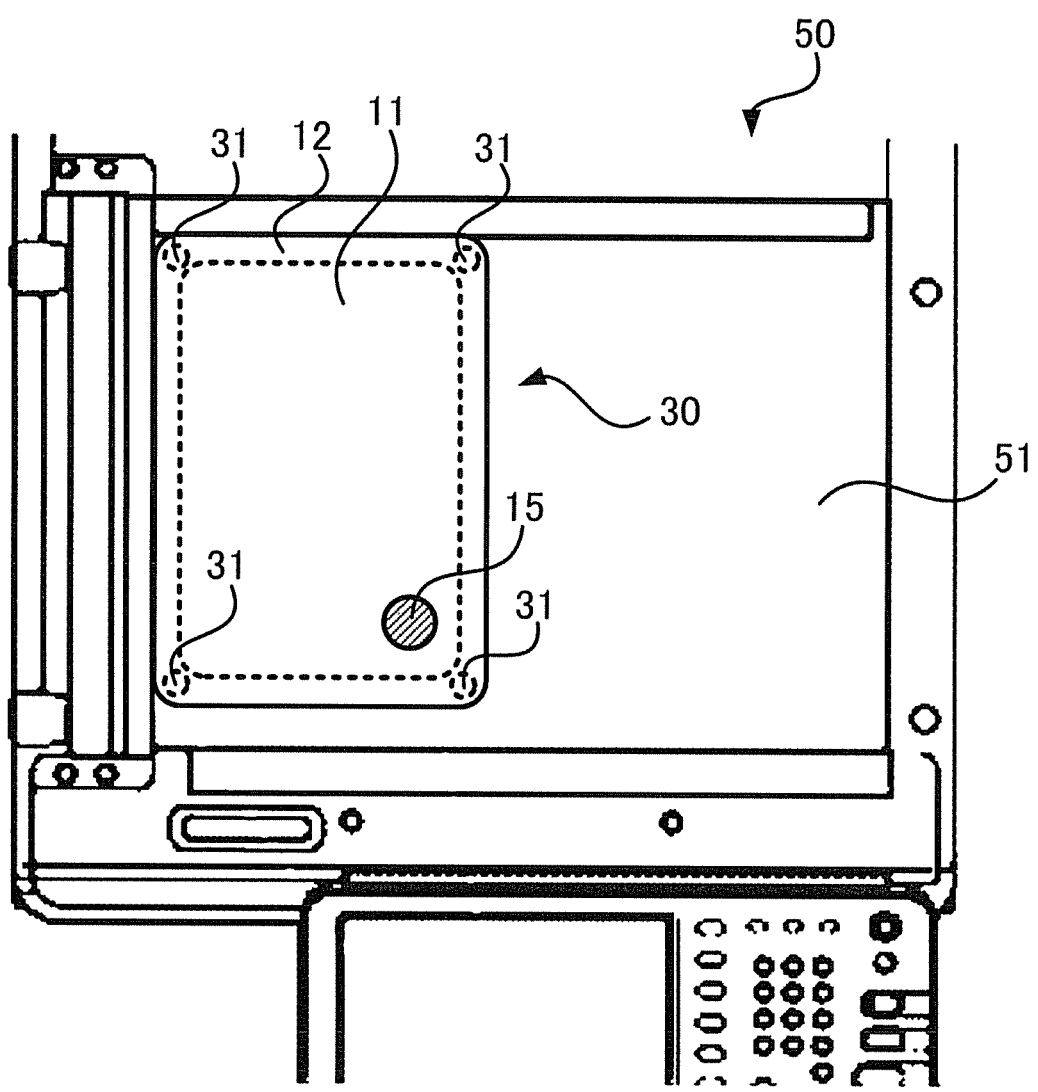
FIG. 17 is a diagram which illustrates a state in which an image displayed in the image display device according to the third embodiment is scanned using a copy machine.

FIG. 16 is a diagram which illustrates a flow for executing a page turning mode in the third embodiment. In addition, FIG. 17 is a diagram which illustrates a state in which an image displayed in the image display device according to the third embodiment is scanned.

In Act 301, when a user sets a page turning mode with respect to the image display device 30, the process proceeds to Act 302 (Yes in Act 301). On the other hand, when the user does not set the page turning mode with respect to the image display device 30 in Act 301, the process does not proceed to Act 302 (No in Act 301).

In Act 302, when the page turning mode is selected by a user, the first image among a plurality of images as scanning targets is displayed on the display screen 11 when the control unit 17 controls the display screen 11.

In Act 303, when the optical sensor 31 in the image display device 30 detects scanning light, the process proceeds to Act 304 (Yes in Act 303). On the other hand, when the optical sensor 31 in the image display device 30 does not detect scanning light in Act 303, the process does not proceed to Act 304 (No in Act 303). When an image displayed on the display screen 11 is scanned, as illustrated in FIG. 17, the image display device 30 is placed on a glass original document table 51 so that the display screen 11 faces the glass original document table 51 of a copy machine 50. The display screen 11 in the image display device 30 is irradiated with scanning light from the copy machine 50, and an image displayed on the display screen 11 is scanned. Here, the optical sensor 31 detects brightness of a threshold value or more. In order to detect irradiation of scanning light with respect to the display screen 11, it is necessary to set the threshold value so as to be lower than a value of brightness of the scanning light. In addition, it is necessary to set the threshold value of brightness in the optical sensor 31 so as to be higher than a value of brightness of natural light or light in room. The reason for this is that the optical sensor 31 detects natural light and lighting in room as the scanning light of the copy machine 50.

In Act 304, an image displayed on the display screen 11 is switching to an image on the next page when the control unit 17 controls the display screen 11. According to the embodiment, it is possible to detect scanning light with which the display screen 11 is irradiated, and to switch an image displayed on the display screen 11, even in a state in which the display screen 11 is placed so as to face the lower part, by arranging the optical sensor 31 at the periphery of the display screen 11 in the housing 32.

In Act 305, the notification unit 14 notifies of switching of an image displayed on the display screen 11 when the control unit 17 controls the notification unit 14.

In Act 306, when a user scans all of images as scanning targets, the process proceeds to Act 307 (Yes in Act 306). On the other hand, when the user does not scan all of images as scanning targets in Act 306, the process does not proceed to Act 307 (No in Act 306).

In Act 307, the notification unit 14 notifies of ending of the page turning mode when the control unit 17 controls the notification unit 14. In addition, it is possible to display the page turning mode ending notification 19 on the display screen 11 when the control unit 17 controls the display screen 11 (refer to FIG. 7).

Fourth Embodiment

In a fourth embodiment, an image display device switches an image displayed on a display screen by receiving an instruction from an external terminal. The image displayed on the display screen can be checked from the external terminal.

Figure 18:
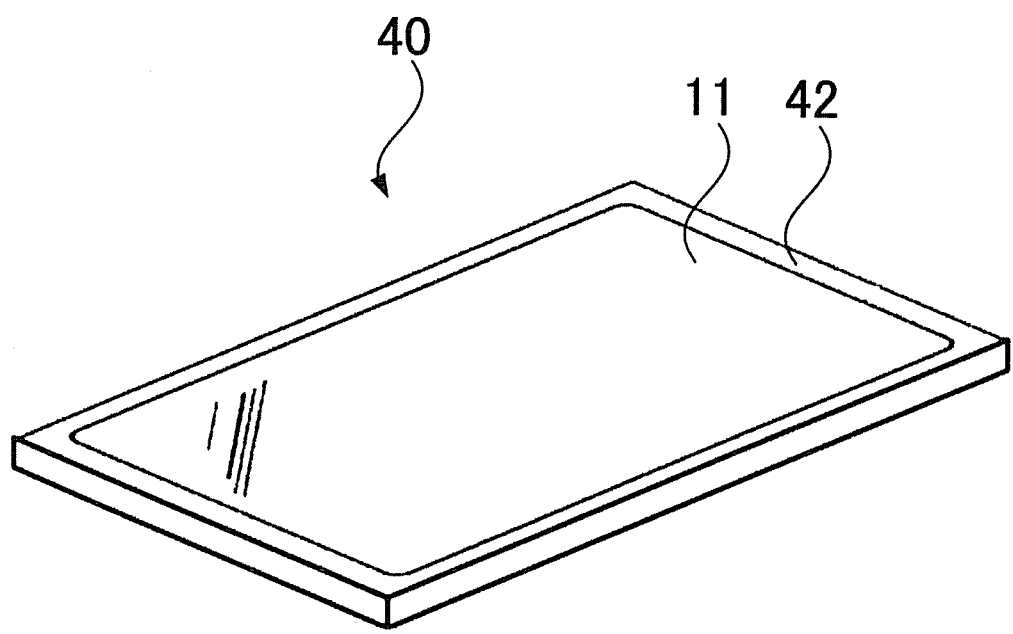
FIG. 18 is a diagram which illustrates the front surface of an image display device according to a fourth embodiment.
Figure 19:
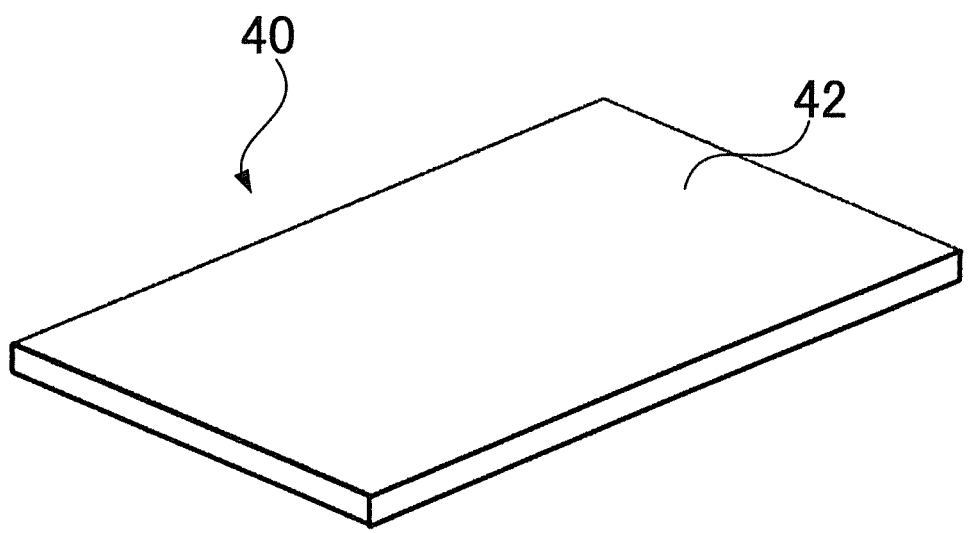
FIG. 19 is a diagram which illustrates the rear surface of the image display device according to the fourth embodiment.

FIG. 18 is a diagram which illustrates the front surface of the image display device according to the fourth embodiment. FIG. 19 is a diagram which illustrates the rear surface of the image display device according to the fourth embodiment.

When describing the fourth embodiment, components having the same function as those in the first embodiment are given the same reference numerals, and descriptions thereof will be omitted.

An image display device 40 according to the fourth embodiment includes a display screen 11, and a housing 42.

Figure 20:
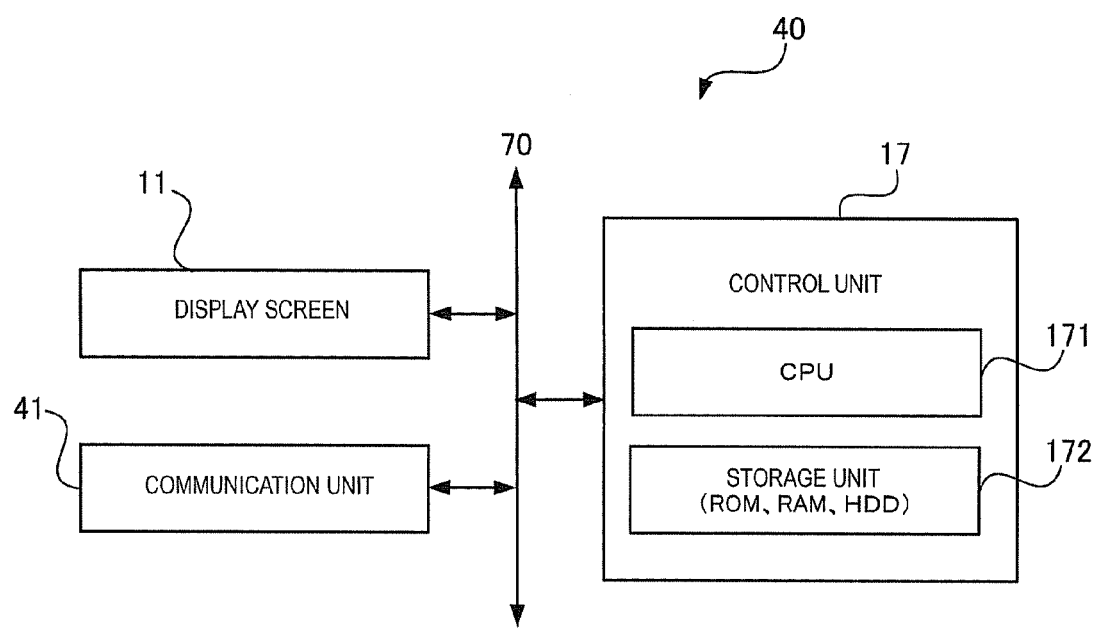
FIG. 20 is a block diagram which illustrates a hardware configuration of the image display device according to the fourth embodiment.

FIG. 20 is a block diagram which illustrates a hardware configuration of the image display device 40 according to the fourth embodiment.

In the image display device 40, the display screen 11, a communication unit 41, and a control unit 17 are connected to each other through a communication bus 70.

Figure 21:
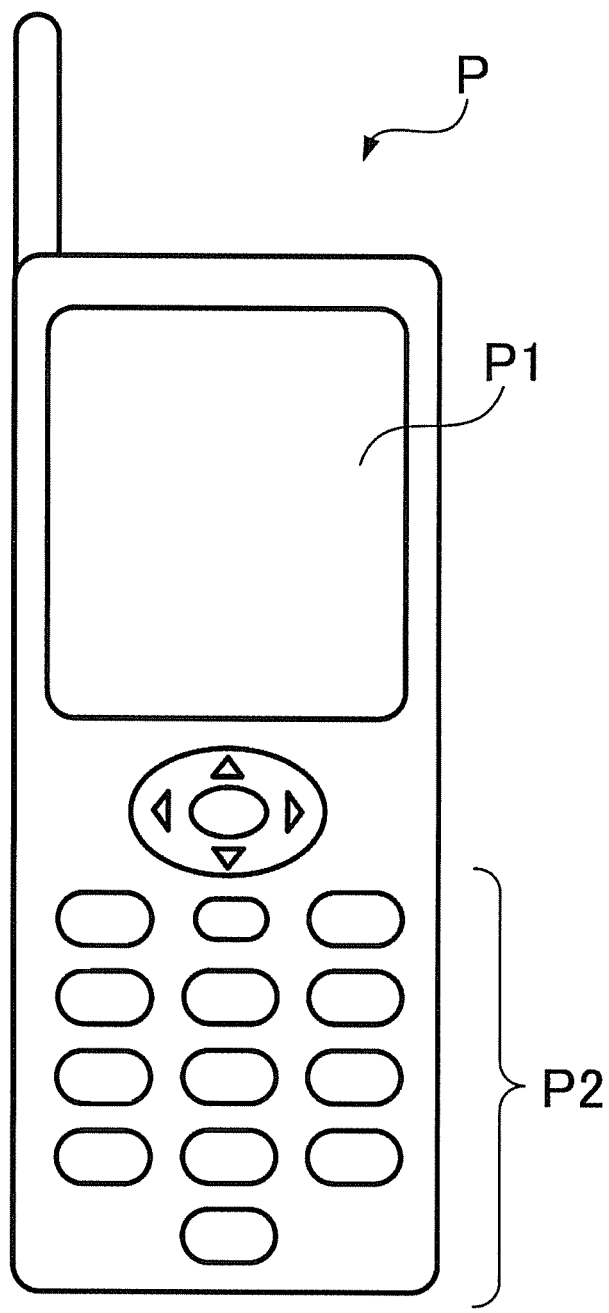
FIG. 21 is a schematic diagram of an external device which performs a communication process with the image display device according to the fourth embodiment.

The communication unit 41 performs a communication process between the image display device 40 and an external terminal P (refer to FIG. 21). The image display device 40 and the external terminal P are connected through a network (not illustrated). Here, a method of connecting the image display device 40 and the external terminal P may be performed in either a wired manner or a wireless manner.

FIG. 21 is a schematic diagram of the external terminal P.

The external terminal P includes a display screen P1 and an operation input unit P2. A function of the display screen P1 is the same as that of the display screen 11. In addition, a function of the operation input unit P2 is the same as that of the operation input unit 13.

Figure 22:
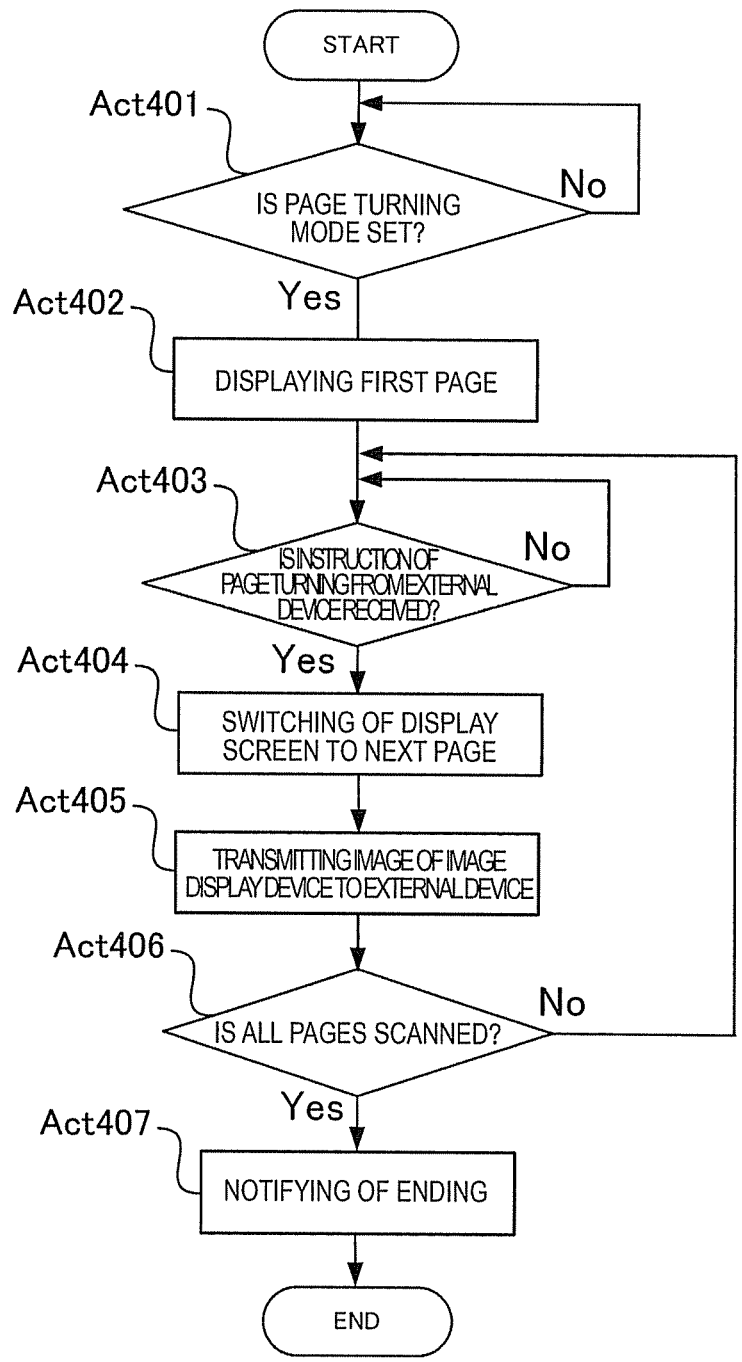
FIG. 22 is a flowchart which illustrates a flow of a page turning operation in the fourth embodiment.
Figure 23:
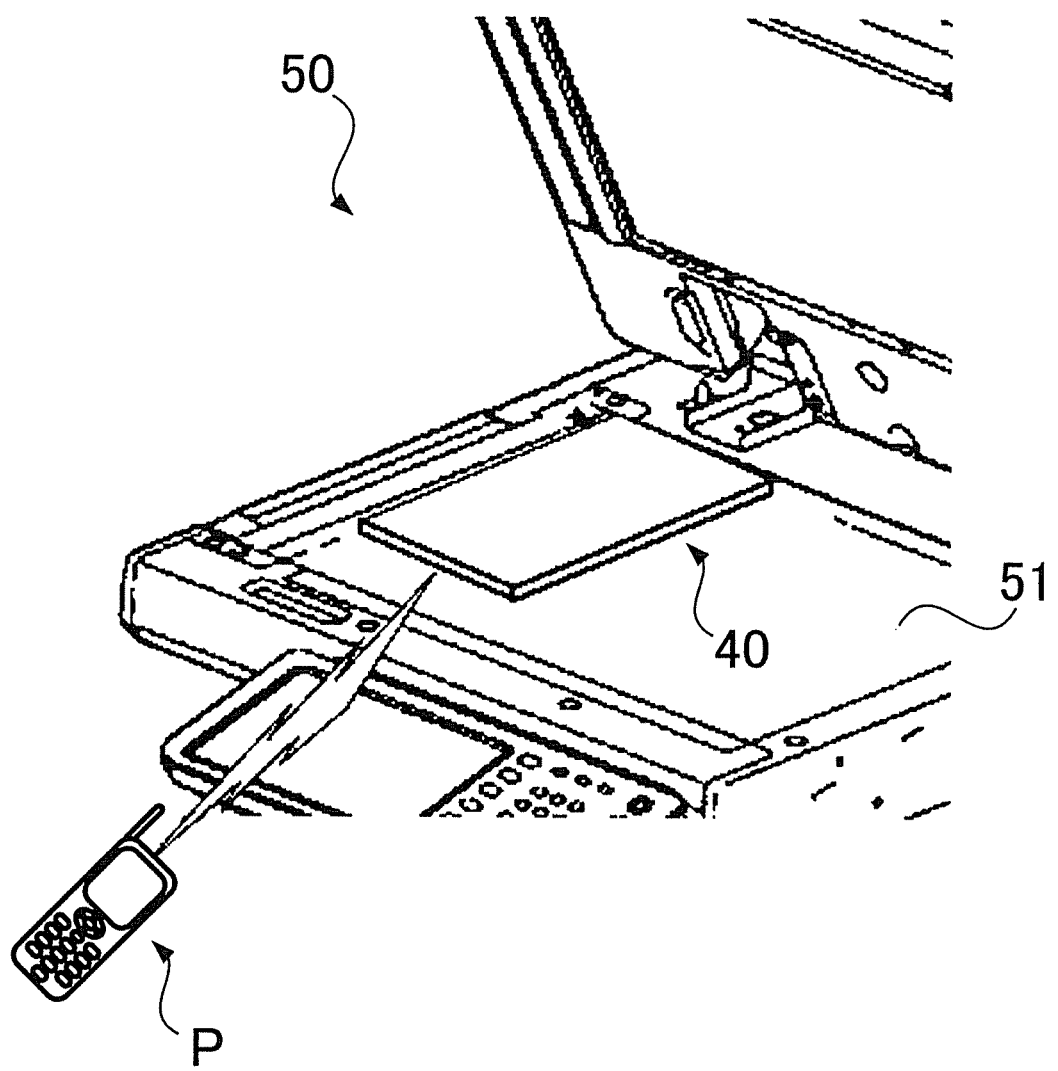
FIG. 23 is a diagram which illustrates a state in which an image displayed in the image display device according to the fourth embodiment is scanned using a copy machine.

FIG. 22 is a flowchart which illustrates a flow of executing a page turning mode by the image display device in the fourth embodiment. In addition, FIG. 23 is a diagram which illustrates a state in which an image displayed in the image display device is scanned using a copy machine.

In Act 401, when a user sets a page turning mode with respect to the image display device 40, the process proceeds to Act 402 (Yes in Act 401). On the other hand, when the user does not set the page turning mode with respect to the image display device 40 in Act 401, the process does not proceed to Act 402 (No in Act 401).

In Act 402, when the user selects the page turning mode, the first image among a plurality of images as scanning targets is displayed on the display screen 11 when the control unit 17 controls the display screen 11.

In Act 403, when the user instructs page turning with respect to the image display device 40 from the external terminal P, the process proceeds to Act 404 (Yes in Act 403).

On the other hand, when the user does not instruct page turning with respect to the image display device 40 from the external terminal P in Act 403, the process does not proceed to Act 404 (No in Act 403). Here, a method of instructing page turning is the same as that in the first embodiment (refer to FIG. 5).

In Act 404, an image displayed on the display screen 11 is switched to an image on the next page when the control unit 17 of the image display device 40 controls the display screen 11. When the user inputs page turning using the external terminal P, the external terminal P transmits the page turning instruction to the image display device 40. The control unit 17 of the image display device 40 switches an image displayed on the display screen 11 according to the received page turning instruction.

In Act 405, when the control unit 17 of the image display device 40 controls the communication unit 41, the communication unit 41 transmits image data of the image displayed on the display screen 11 to the external terminal P. The external terminal P receives the image data, and causes the image to be displayed on the display screen P1. A user can check an image displayed in the image display device 40 by viewing the image displayed on the display screen P1. In Act 406, when the user scans all of images as scanning targets, the process proceeds to Act 407 (Yes in Act 406). On the other hand, when the user does not scan all of images as scanning targets in Act 406, the process proceeds to Act 403 (No in Act 406).

In Act 407, the notification unit 14 notifies of ending of the page turning mode when the control unit 17 controls the notification unit 14. In addition, it is possible to display the page turning mode ending notification 19 on the display screen 11 when the control unit 17 controls the display screen (refer to FIG. 7). Here, the page turning mode ending notification 19 may be displayed on the display screen P1 in the external terminal P.

As described above, according to the technology which is described in the specification, an image display device can scan a plurality of images as scanning targets in a state in which the image display device is placed on a glass original document table by causing a display screen to face the glass original document table of a copy machine.

It is possible to arbitrarily combine constituent elements in the above described first to fourth embodiments with each other. For example, it is possible to combine the operation input unit in the first embodiment, the rear surface display screen in the second embodiment, the optical sensor in the third embodiment, and the external terminal in the fourth embodiment with each other as constituent elements.

In addition, the method of notifying using the notification unit is not necessarily limited to the notification using sound and the notification using lighting or blinking of a light.

The display screen is not necessarily limited to electronic paper, and may be a screen on which an image is displayed using a display mechanism which can optically perform scanning in a copy machine.

An image displayed on the rear surface display screen is not necessarily the same image as that displayed on the display screen, and may be an image which denotes the image displayed on the display screen.

In addition, an image displayed on the external device is not necessarily the same image as that displayed on the display screen, and may be an image which denotes the image displayed on the display screen.

An image displayed on the rear surface display screen and the external device is not necessarily the same as an image displayed on the image display device. The image displayed on the rear surface display screen and the external device may be information denoting an image displayed on the image display device such as a thumbnail image, for example. In addition, the image displayed on the rear surface display screen and the external device may be information denoting a scanning progress.

In addition, in each embodiment, it is possible to include a code such as a QR code, for example, at a part of an image which is displayed in the image display device. In the code, it is possible to include information such as an image size, an image resolution, a printing range, a magnification of copying, the number of pages, the number of copies, and a rewriting cycle of a screen of a display device. A device for reading a code is provided in a copy machine. When a code is included in a part of an image which is a scanning target at a time of performing scanning using a copy machine, the copy machine performs scanning based on information of the code.

A case in which a function of executing the exemplary embodiment is recorded in the device in advance is described in the embodiment; however, there is no limitation to this, and the same function may be downloaded to the device from a network, or a recording medium in which the same function is stored may be installed in the device. As the recording medium, when it is a recording medium which can store a program, and can be read by the device such as a CD-ROM, a form thereof may be any form. In addition, the function which can be obtained through installing or downloading in advance in this manner may be executed in cooperation with an operating system (OS), or the like, in the device.

While certain embodiments have been described, these embodiments have been presented by way of example only, and are not intended to limit the scope of invention. Indeed, the novel apparatus and methods described herein may be embodied in a variety of other forms; furthermore, various omissions, substitutions, and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image display device comprising:
   a display screen which is arranged on one surface of a housing and displays a page image using a display mechanism in which scanning can be optically performed in a copy machine;
   an operation input unit which is arranged on the other surface of the housing and receives an operation input of a user for switching a page image displayed on the display screen among a plurality of pages images set as a scanning target;
   a control unit which switches a page image displayed on the display screen among the plurality of page images according to the operation input; and
   a notification unit which notifies of switching of a the image when the image displayed on the display screen is switched.

2. The device according to claim 1,
   wherein the notification unit notifies of switching of a page image displayed on the display screen using sound.

3. The device according to claim 1,
   wherein the notification unit is a light, and notifies of switching of a the image displayed on the display screen using lighting or blinking of the light.

4. The device according to claim 1,
wherein the notification unit is arranged on a face on the opposite side to the display screen, and is a rear surface display screen on which information denoting a page image displayed on the display screen is displayed.

5. The device according to claim 4,
wherein the rear surface display screen is a touch panel, and
wherein the operation input unit is displayed as a page image on the rear surface display screen.

6. The device according to claim 1, wherein the operation input unit is a physical key.

7. An image display device comprising:
a display screen which displays a page image using a display mechanism in which scanning can be optically performed in a copy machine;
an optical sensor which is arranged at the periphery of the display screen on a plane including the display screen, and detects brightness of a predetermined threshold value or more;
a control unit which switches a page image displayed on the display screen from a first page image among a plurality of page images set as scanning target to a second page image among a plurality of page images set as scanning target, when the optical sensor detects brightness of the predetermined threshold value or more; and
a notification unit which notifies of switching of a page image when the image displayed on the display screen is switched.

8. The device according to claim 7,
wherein the notification unit notifies of switching of a page image displayed on the display screen using sound.

9. The device according to claim 7,
wherein the notification unit is a light, and notifies of switching of a page image displayed on the display screen using lighting or blinking of the light.

10. The device according to claim 7,
wherein the notification unit is a rear surface display screen which is arranged on a face opposite to the display screen, and displays an image denoting a page image displayed on the display screen.

11. An image display device comprising:
a display screen which is arranged on one surface of a housing and displays an image using a display mechanism in which scanning can be optically performed in a copy machine;
a communication unit which controls a communication with an external device;
a control unit which switches an image displayed on the display screen when the communication unit receives an instruction of switching an image displayed on the display screen from the external device; and
an external display screen which is arranged on the other surface of the housing and displays a same image displayed on the display screen.

12. The device according to claim 11,
wherein the notification unit notifies of switching of a page image displayed on the display screen using sound.

13. The device according to claim 11,
wherein the notification unit notifies of switching of a page image displayed on the display screen using lighting or blinking of a light.

* * * * *